April 21, 1970     H. SCHMIDT     3,507,075

SHAPE GRINDING MACHINE WITH DUAL OPTICAL DEVICES

Filed Dec. 28, 1966     3 Sheets-Sheet 1

INVENTOR.
Hans Schmidt

INVENTOR.
Hans Schmidt

April 21, 1970     H. SCHMIDT     3,507,075
SHAPE GRINDING MACHINE WITH DUAL OPTICAL DEVICES
Filed Dec. 28, 1966     3 Sheets-Sheet 3
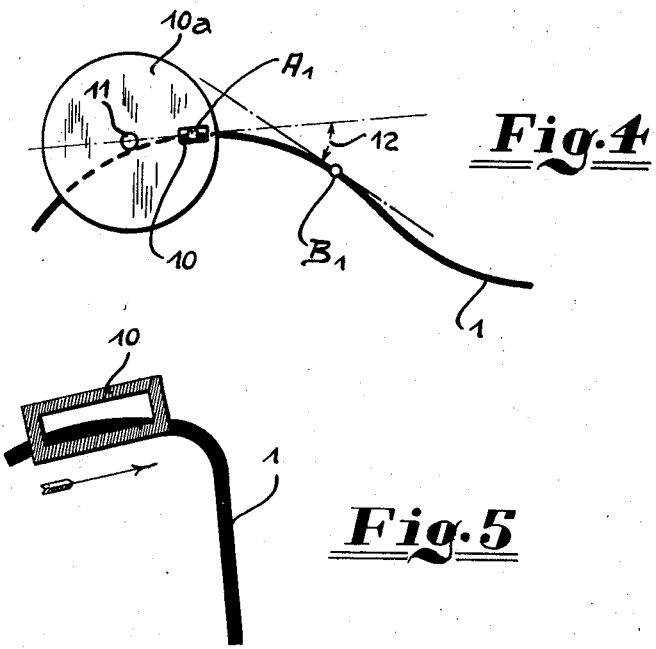
Fig.4
Fig.5
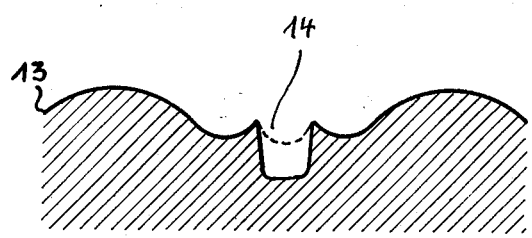
Fig.6
INVENTOR.
Hans Schmidt

United States Patent Office 3,507,075
Patented Apr. 21, 1970

3,507,075
SHAPE GRINDING MACHINE WITH DUAL
OPTICAL DEVICES
Hans Schmidt, Mannheim-Feudenheim, Germany, assignor to Hommelwerke Gesellschaft mit beschrankter Haftung, Mannheim-Kafertal, Germany
Filed Dec. 28, 1966, Ser. No. 605,466
Claims priority, application Germany, Jan. 3, 1966,
H 58,130
Int. Cl. B24b 49/12
U.S. Cl. 51—165                                    5 Claims

ABSTRACT OF THE DISCLOSURE

A shape grinding machine equipped, in addition to a known optical scanning device, with a second optic projecting the shape profile to be ground from a pattern. An observing instrument, e.g., a microscope, may be attached to both optics.

BACKGROUND OF THE INVENTION

Precise machining of shapes or profiles on workpieces, such as tools, calipers and gauges, can be carried out with a grinding machine whereby the relative movement between workpiece and grinding wheel or disc is in accordance with an enlarged pattern, e.g., a drawing, and is controlled in such a manner that the grinding disc produces the desired shape. In order to follow each curvature, the movement usually is resolved into the two coordinates of a right-angle coordinate system, so that the resultant of the two partial movements can be adjusted tangentially thereto at each point of the curve. This commonly is accomplished by means of a cross slide whose partial slides are in rectangular position relative to each other for the control of the machine the two partial slides hence are to be driven in such a manner that the work piece (or the grinding disc), disposed on the cross slide, moves in accordance with the true curve. This control can be carried out, e.g., manually, the operator driving both partial slides by hand wheels. The workpiece to be ground thereby is observed by means of a projection system and compared to the pattern.

DESCRIPTION OF THE PRIOR ART

Machining processes of low precision are known, such as gas cutting, wherein a cross slide is controlled with the aid of a photoelectric scanning or hunting device which, in most instances, automatically scans the profile curve which is drawn on a reduced scale. The application of such a device meets with several difficulties. A ground profile or shape should have the highest possible precision. The distortion of the ground shape, caused by the rounding of the edge of the grinding disc must be considered in the pattern. Since the disc must penetrate the shape from the outside and has a definite width, some profiles cannot be entirely ground automatically because they are, e.g., undercut or have corners so sharp that the grinding disc must be very sharp and, hence, is not suited for the grinding of the remaining portions of the shape.

SUMMARY OF THE INVENTION

It is an object of the invention to utilize the photoelectric device described above on shape grinding machines. This is accomplished by providing the machine with a second optical device which carries out a projection of the shape on the workpiece to a pattern. Only the combination of the two optics enables the proper use of photoelectric scanning on the grinding machine. The result of automatic grinding can constantly be surveyed. Aside from automatic scanning, the machine also can be manually controlled, so that such locations of the profile which cannot be ground automatically (or only with difficulty) can be finished manually at the same setting of the workpiece.

The photoelectric device opportunely is provided with observing means, e.g., a microscope, so that the situation of the scanner can be observed particularly upon its adjustment to the pattern. Since it is advantageous to observe the scanner as well as the projection of the workpiece on the pattern at any time, the eyepieces should be close enough to each other to enable the observer to look into either without changing his location. Both pattern and workpiece image advantageously are in the same plane, e.g., as drawn shapes so that the disposition of the two eyepieces as named is made feasible.

BRIEF DESCRIPTION OF THE DRAWINGS

FIG. 4 is a schematic of the scanning means controlling the resolution;
FIG. 5 is an enlarged detail of FIG. 4;
and
FIG. 6 is a schematic of alternate automatic and manual controls.

DESCRIPTION OF PREFERRED EMBODIMENTS

Figure 1:
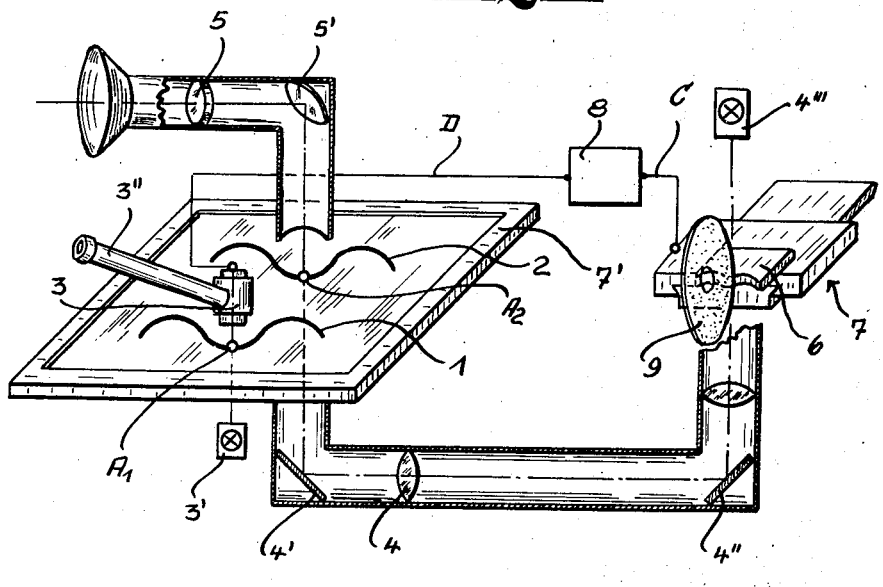
FIG. 1 is a schematic showing of the optical control means on the cross slide and workpiece, respectively.
Figure 2:
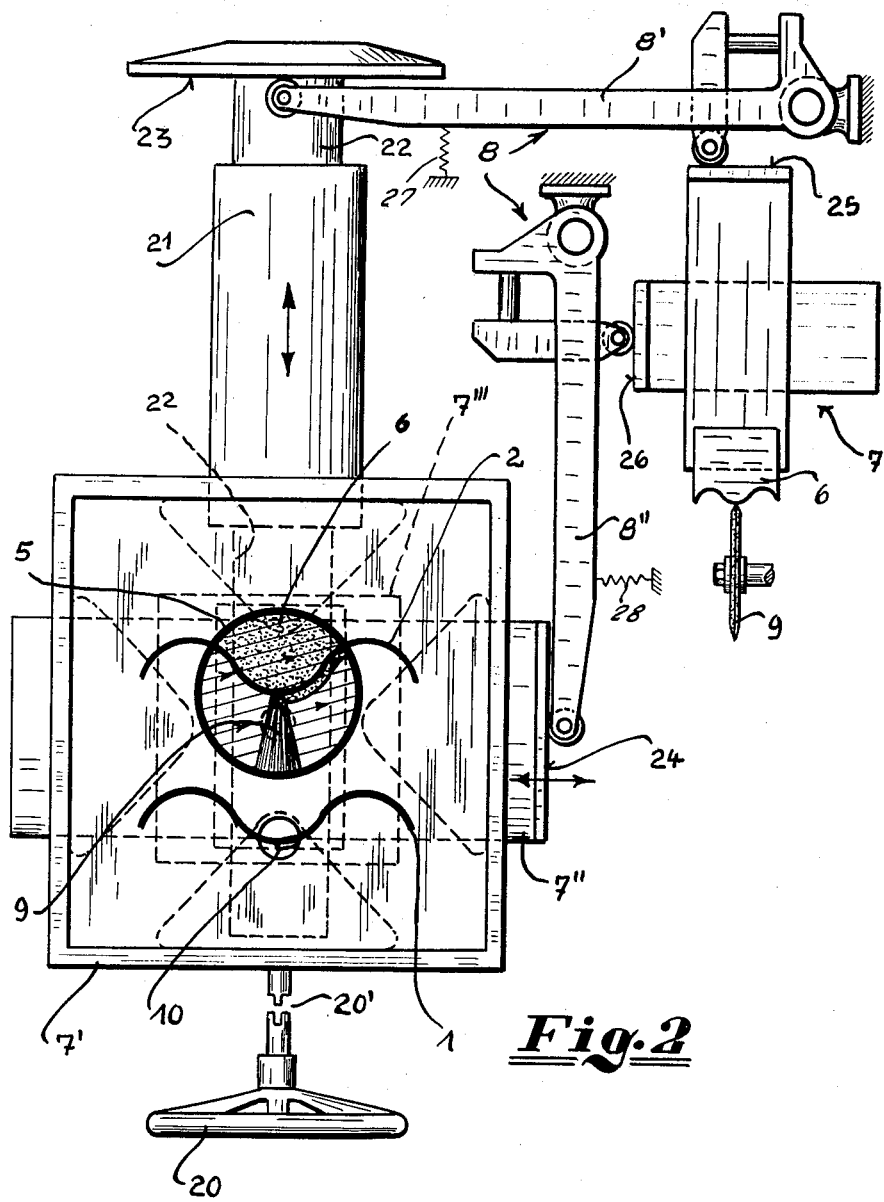
FIG. 2 is a schematic showing of an embodiment according to FIG. 1.

FIG. 1 is the schematic layout of the shape grinding machine; 1 is the control shape according to which the photoelectric scanning or hunting device 3–3′–3″ directs the movement of cross slide 7 by way of the coordinate resolution system 8. The latter is connected to cross slide 7 by wire C. This may, e.g., be a drawn line on transparent material. The commonly used driving elements for the cross slide 7′ bearing the transparent with the control pattern 1 are shown in FIG. 2. The workpiece 6 is tightened to the cross slide 7 and is machined by the grinding wheel 9 by being carried along the same. The wheel, in this instance, does not shift. At this time, the axis of the scanner is on point $A_1$ of the control shape.

The projecting device 4–4′–4″–4‴ produces a picture of the workpiece shape in the plane of the pattern (or master or test shape) 2 which is observed by means of the arrangement 5–5′. The axis of the projector at this time is on point $A_2$ which corresponds to $A_1$ of the master or test shape. It is clearly seen that the eyepiece 3″ of the scanner and eye 5 of the projector are disposed in immediate vicinty relative to each other, so that the observer can alternately use one or the other without changing his location. The projected workpiece picture is compared with the control shape 1. When, in addition to the photoelectric control, a manual control is installed, it is possible to switch the automatic control off and correct the machined shape by hand.

Figure 3:
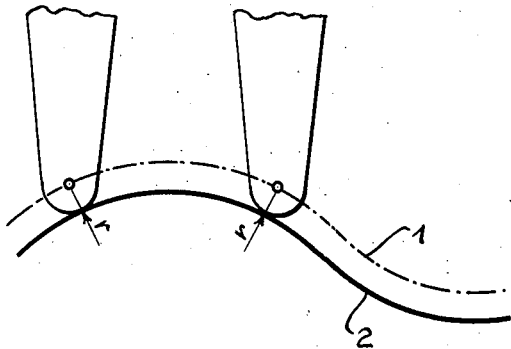
FIG. 3 is a schematic illustration of the derivation of the cutting curve.

FIG. 3 illustrates that the control shape 1 must be different from test shape 2 because the grinding wheel has a rounded edge. A sharp edge does not remain sharp due to wear during grinding. The difference equals the center of a circle of radius $r$ which rolls off the shape 2.

In FIG. 4 the photoelectric scanner is shown which is provided with a slit 10 in a washer 10a which is rotatable with the center line 11 of a spindle and follows control shape 1. When slit 10 moves from point $A_1$ to point $B_1$ of shape 1, it swings about center 11 in the area of angle 12. This swinging movement is transmitted to the coordinate resolution device 8 which controls cross slide 7. A photoelectric cell directs the drive of the cross slide 7′ to move to and from in dependence of the intensity of the light ray falling through the slit when it travels along the shape 1.

The precision of this control can be increased in such a manner that the coordinate resolution system 8 controls the second cross slide 7' by way of wire D. The latter transfers its movements which are reduced by transmission means, such as lever (FIG. 2), to cross slide 7 which carries workpiece 6. This facilitates that the elements of coordinate resolution system 8 carry out longer paths than required for the movement of the workpiece, which has the advantage that errors in the paths of the resolution device are transferred to the workpiece on a reduced scale.

The manual control is constructed in such a manner that the coordinate resolution deivce 8 is actuated by a hand wheel 20 which transfers the desired movements to cross slide 7, if desired by way of intermediate cross slide 7'. It is opportune to install inactivating means 20' for the hand wheel, so that the manual control does not operate when the photoelectric scanner is operating since otherwise the hand wheels would turn.

FIG. 6 shows the advantages of the alternate automatic and manual controls. A shape 13, as shown, could be machined automatically only with difficulty. With the device according to the invention, grinding can be carried out in part automatically and in part manually. The center portion of the shape with its steep sides, during the automatic run, is ground as shown by the broken line 14 and then is finished by hand. The advantage of the photo-electric control thus can be utilized for the largest portion of the shape. The photoelectric hunting device (FIG. 1) contains the lamp 3' and the photoelectric cell 3. FIG. 2 shows the picture which can be observed in the tube 5. The light ray from slit 10 (FIG. 5) increases or decreases in its intensity in dependence of the convexity or concavity of the control shape 1 which it follows. The intensity is used to influence the direction of the motor of cross slide 7' (FIG. 2), which bears a transparent plate with a pattern and with the live picture of the workpiece 6 and grinding wheel 9. The motor for the horizontal cross slide 7'' is not shown. The motor for the cross slide 7''' is a hydraulic cylinder 21 with the piston rod 22. The piston rod 22 bears the cross slide 7''' and a ledge 23. A correspondent ledge 24 is fixed to the cross slide 7''. The levers 8' and 8'' of the system 8 are held in contact with the ledges 23 and 24 and with ledges 25 and 26 of the cross slides 7 under the pressure of springs 27 and 28, respectively.

The operation of the above described device is as follows:

The control shape is carried by the slide 7'. The slide 7' is moved laterally by a motor (not shown) and frontward and rearward (FIG. 2) by a motor, namely the hydraulic cylinder 21. The slide 7' is moved by these motors in response to the scanning by the scanning disc or chopper 10a, as will be expalined presently. As the slide 7' moves, there will move the slides 7'' and 7''', thereby directing the movement of the slides 7 for moving the workpiece 6.

The chopper 10a has a radial rectangular slit 10 (FIG. 5), and rotates with its spindle about the axis 11 (FIG. 4). A beam of light is directed towards the chopper 10a by the light source 3', and passes through the slit 10 of the chopper (FIG. 5), and ultimately is received by the photoelectrode mechanism 3.

As previously indicated, the light beam that passes through the slit 10 changes its intensity in dependence of the convexity or, respectively, concavity of the pattern 1 which it follows. The intensity of the light beam received by the photoelectric cell will result in a corresponding movement of the respective of the aforesaid motors.

The optical observation is best shown in FIG. 1. As the slide 7' moves, the test shape 2 will move accordingly. The light source 4''' projects an image of the workpiece 6 through the lenses including the lens 4, and with the aid of the mirrors 4', 4'' and 5' to be observed by the operator in the objective. That image is projected onto the surface of the slide 7', where it can be viewed by the operator. What the operator will see, is shown in FIG. 2. Both the pattern 1 and the shape 2 are transparent and are placed parallel to each other on the screen of the slide 7'. The scanning device follows the pattern 1, while the projected shape of the workpiece 6 follows the test shape 2. Onto the test shape 2, there is projected that part of the workpiece 6 which is worked upon by the grinder 9. The two curves, namely the pattern 1 and the test shape 2 are sufficiently close to each other to permit close surveillance.

I claim as my invention:

1. In a shape grinder provided with cross slides for carrying the workpiece to be ground, grinding means, an optical scanner, a control shape, means for controlling the relative movements of said cross slides and said grinding means from said control shape, a test shape, an optical projector which produces a picture of the contour of said workpiece onto said test shape, the improvement which comprises said test shape being disposed substantially parallel to and near said control shape though distorted relative to said control shape, for permitting close surveillance of the grinding.

2. The shape grinder as defined in claim 1, wherein both said scanner and said projector are provided with an eyepiece in immediate vicinity relative to each other.

3. The shape grinder as defined in claim 1, wherein said control shape and said test shape are disposed in the same plane.

4. The shape grinder as defined in claim 3, wherein the grinding means is a grinding wheel; the control shape equals the path of the center of a circle having a given radius rolling off the test shape; and the edge of the grinding wheel is rounded, having the same radius.

5. In a shape grinder provided with a first pair of cross slides carrying the workpiece to be ground, a grinding wheel which is stationary in horizontal direction, a second pair of cross slides carrying a transparent plate, said plate supporting a control shape and a test shape, the first and the second cross slide pairs being connected by a reducing leverage, an optical scanner including a disc having a slit, a lamp and a photoelectric cell, which receives the light rays from the lamp after passing through the slit, a portion of the area of the slit being obscured by respective portions of said control shape, whereby the light rays influence by the varying intensity the photoelectric cell for controlling the movement of the cross slides, an optical projection system projecting an image of the workpiece onto said test shape, an eyepiece of the optical projection system and close thereto an eyepiece of the photoelectric system; permitting close surveillance of the grinding.

References Cited

UNITED STATES PATENTS

| 2,164,169 | 6/1939 | Wohlfarth | 51—165 |
| 2,203,389 | 6/1940 | Kurtz | 90—13 |
| 2,404,770 | 7/1946 | Bennett et al. | 51—165 |
| 2,464,293 | 3/1949 | Cooke et al. | 51—100 |
| 2,868,993 | 1/1959 | Henry | 90—62 X |
| 3,039,238 | 6/1962 | Banko | 51—165 |
| 3,195,410 | 7/1965 | Colten et al. | 90—13 |

FOREIGN PATENTS

| 973,591 | 4/1960 | Germany. |
| 1,139,769 | 11/1962 | Germany. |
| 1,140,101 | 11/1962 | Germany. |

OTHER REFERENCES

Optisches Profilschleifen von W. Erdmann, Deutscher Fachzeitschriften- und Fachbuchverlag, 1955, pp. 22–23.

LESTER M. SWINGLE, Primary Examiner

U.S. Cl. X.R.

51—100